US010288762B2

(12) United States Patent
Basu

(10) Patent No.: US 10,288,762 B2
(45) Date of Patent: May 14, 2019

(54) SYSTEMS AND METHODS FOR DETECTING LUGGAGE IN AN IMAGING SYSTEM

(71) Applicant: Morpho Detection, LLC, Newark, CA (US)

(72) Inventor: Samit Kumar Basu, Fremont, CA (US)

(73) Assignee: MORPHO DETECTION, LLC, Newark, CA (US)

( * ) Notice: Subject to any disclaimer, the term of this patent is extended or adjusted under 35 U.S.C. 154(b) by 185 days.

(21) Appl. No.: 15/188,440

(22) Filed: Jun. 21, 2016

(65) Prior Publication Data

US 2017/0365074 A1    Dec. 21, 2017

(51) Int. Cl.
| | | |
|---|---|---|
| *G06K 9/00* | (2006.01) | |
| *G01V 5/00* | (2006.01) | |
| *G06T 7/00* | (2017.01) | |
| *G06T 11/00* | (2006.01) | |

(52) U.S. Cl.
CPC ............ *G01V 5/005* (2013.01); *G06T 7/0004* (2013.01); *G06T 11/008* (2013.01); *G06T 2207/10081* (2013.01); *G06T 2207/30112* (2013.01)

(58) Field of Classification Search
CPC ........................................... G06T 2207/30232
See application file for complete search history.

(56) References Cited

U.S. PATENT DOCUMENTS

| | | | |
|---|---|---|---|
| 7,327,853 B2 | 2/2008 | Ying et al. | |
| 7,844,118 B1 * | 11/2010 | Li ........................... | G06T 5/003 382/181 |
| 7,933,375 B2 | 4/2011 | Pack | |
| 8,081,733 B2 | 12/2011 | Basu et al. | |
| 2008/0137803 A1* | 6/2008 | Wu ......................... | A61B 6/032 378/5 |
| 2009/0175411 A1 | 7/2009 | Gudmundson | |
| 2010/0092057 A1* | 4/2010 | Garms ................. | G01V 5/0016 382/131 |

(Continued)

FOREIGN PATENT DOCUMENTS

| | | |
|---|---|---|
| EP | 942295 A2 | 9/1995 |
| WO | 2014003782 A1 | 1/2014 |

OTHER PUBLICATIONS

United Kingdom Intellectual Property Office Search Report, Application No. GB1709149.7, dated Nov. 7, 2017, 3 pps.

*Primary Examiner* — Oneal R Mistry
(74) *Attorney, Agent, or Firm* — Armstrong Teasdale LLP

(57) ABSTRACT

A luggage detection device is configured to detect luggage by generating computed tomography (CT) imaging slices. For each of the CT imaging slices, the luggage detection device is configured to identify at least one region within the CT imaging slice for removal based on at least one predefined rule, to remove pixel data associated with the at least one identified region within the CT imaging slice, to generate a pixel count representing a number of pixels in the modified CT imaging slice that include a value above a threshold pixel value, and to generate an object indicator based on a determination that the generated pixel count is above a threshold pixel count. The luggage detection device is further configured to display at least one of the plurality of CT image slices based on the presence of the corresponding baggage indicator.

18 Claims, 5 Drawing Sheets

(56) References Cited

U.S. PATENT DOCUMENTS

2011/0227910 A1* 9/2011 Ying .................. A61B 6/032
345/419
2015/0332448 A1* 11/2015 Zhang ................ G01V 5/005
382/103

* cited by examiner

SYSTEMS AND METHODS FOR DETECTING LUGGAGE IN AN IMAGING SYSTEM

BACKGROUND

The embodiments described herein relate generally to image processing, and more particularly, to detecting luggage from imaging data generated by a computed tomography (CT) imaging system.

Known luggage scanning systems, such as explosives detection systems (EDS) that perform computed tomography (CT) scanning, are designed to scan a continuous stream of luggage and other objects to provide adequate throughput for travelers at an airport, for example. As a result, techniques have been developed to delineate the beginning and the end of each object, such as a travel bag, in the continuous scan of luggage. Traditional methods for this object boundary detection rely on multiple optical sensors to find the edges of luggage items within a scan tunnel of the luggage scanning system. However, drawbacks of such systems persist because the employed optical sensors may have gaps in sensing coverage or may cover only a small portion of the scan tunnel. Some conventional scanning systems use imaging data from X-ray detectors to identify the leading and the trailing edges of a piece of luggage.

However, if an X-ray detector is triggered by a spurious impetus, such as a vibration in the system, an object stuck to the conveyor belt, or other external causes, it is difficult to correlate those triggers back to a physical object (e.g., a bag) in the system. Furthermore, the optical sensors and X-ray detectors can indicate different spatial locations of the leading and of the trailing edges of a particular bag. This disagreement between different spatial locations of the bag edges prompts situations where a bag is deemed to be present by one of the two systems and not by the other system, leading to the detection of false positives ("phantom bags") and false negatives ("chopped bags"). Moreover, because conventional detection occurs in a non-reconstruction domain of the raw imaging data (i.e., non-human readable), it remains difficult for a user to visually interpret the occurrence of a false positive or a false negative.

BRIEF SUMMARY

In one aspect, a luggage detection device for detecting luggage in a computed tomography (CT) imaging system is provided. The luggage detection device includes a processor coupled to a memory device and to the CT imaging system. The luggage detection device is configured to detect luggage by receiving CT imaging data generated by the CT imaging system and by generating a plurality of CT imaging slices from the CT imaging data. For each of the plurality of CT imaging slice, the luggage detection device is configured to detect luggage by identifying at least one region within the CT imaging slice for removal based on at least one predefined rule, modifying the CT imaging slice by removing pixel data associated with the at least one identified region within the CT imaging slice, generating a pixel count representing a number of pixels in the modified CT imaging slice that have a value above a predefined threshold pixel value, and generating an object indicator representing whether luggage is detected in the CT imaging system based on a determination that the generated pixel count is above a predefined threshold pixel count. The luggage detection device is further configured to detect luggage by displaying to a user the at least one of the plurality of CT image slices based on the presence of the corresponding baggage indicator.

In another aspect, a computer-implemented method for detecting luggage in a computed tomography (CT) imaging system is provided. The method is implemented using a luggage detection device that includes a processor coupled to a memory device and to the CT imaging system. The method includes receiving CT imaging data generated by the CT imaging system and generating a plurality of CT imaging slices from the CT imaging data. For each of the plurality of CT imaging slices, the method further includes identifying at least one region within the CT imaging slice for removal based on at least one predefined rule, modifying the CT imaging slice by removing pixel data associated with the at least one identified region within the CT imaging slice, generating a pixel count representing a number of pixels in the modified CT imaging slice that have a value above a predefined threshold pixel value, and generating an object indicator representing whether luggage is detected in the CT imaging system based on a determination that the generated pixel count is above a predefined threshold pixel count. The method also includes displaying to a user the at least one of the plurality of CT image slices based on the presence of the corresponding baggage indicator.

In yet another aspect, at least one non-transitory computer-readable storage media that has computer-executable instructions embodied thereon is provided. When executed by at least one processor, the computer-executable instructions cause the processor to receive CT imaging data generated by the CT imaging system and generate a plurality of CT imaging slices from the CT imaging data. The computer-executable instructions also cause the processor to, for each of the plurality of CT imaging slices, identify at least one region within the CT imaging slice for removal based on at least one predefined rule, modify the CT imaging slice by removing pixel data associated with the at least one identified region within the CT imaging slice, generate a pixel count representing a number of pixels in the modified CT imaging slice that have a value above a predefined threshold pixel value, and generate an object indicator representing whether luggage is detected in the CT imaging system based on a determination that the generated pixel count is above a predefined threshold pixel count. The computer-executable instructions also cause the processor to display to a user the at least one of the plurality of CT image slices based on the presence of the corresponding baggage indicator.

BRIEF DESCRIPTION OF THE DRAWINGS

FIG. 1 is a perspective view of an exemplary CT imaging system;

FIG. 2 is a schematic diagram of the CT imaging system shown in FIG. 1;

FIG. 3 is a block diagram of an exemplary computing device that may be used with the CT imaging system shown in FIGS. 1 and 2;

FIG. 4 is a schematic flowchart of an exemplary method of processing imaging data from a CT imaging system as shown in FIG. 1; and FIG. 5 is a schematic flowchart of an exemplary method of detecting luggage from imaging data from a CT imaging system as shown in FIG. 1.

DETAILED DESCRIPTION

Figure 1:
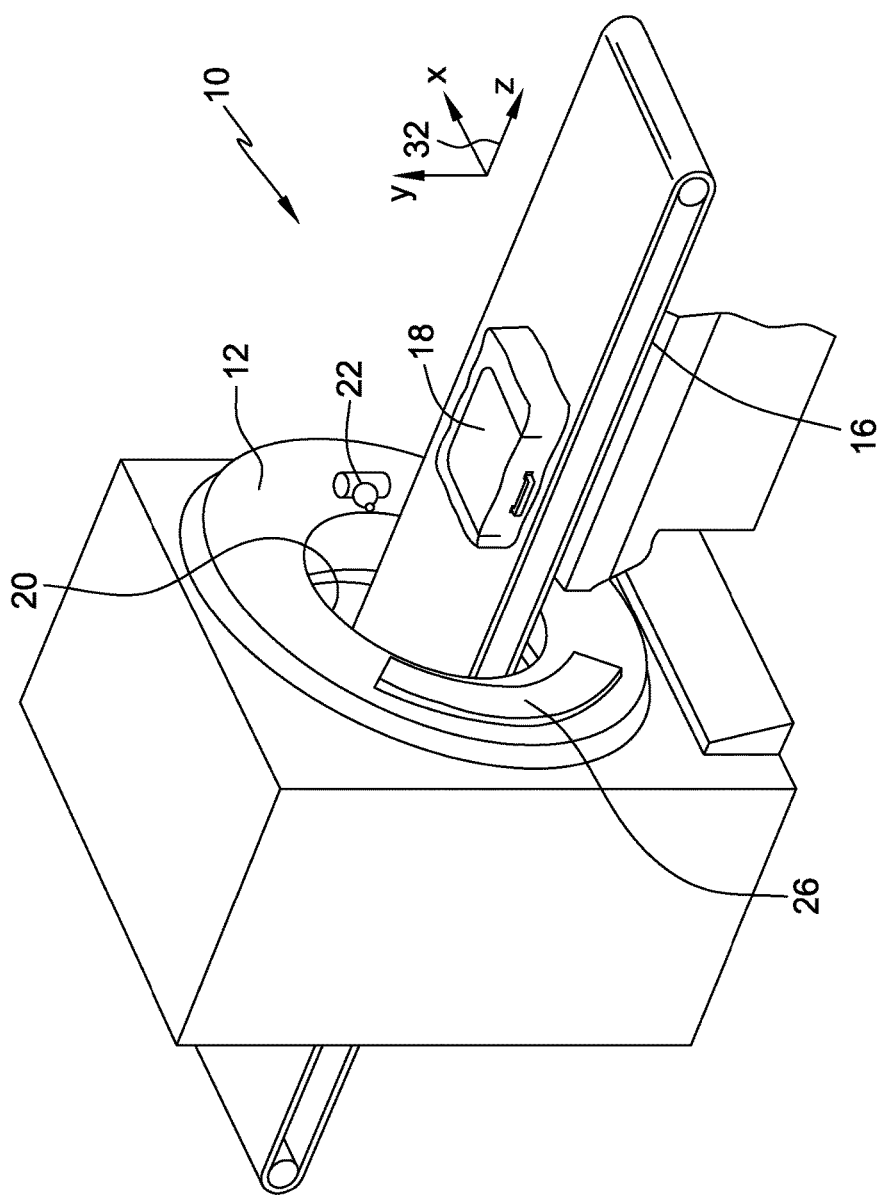
FIGS. 1-5 show exemplary embodiments of the systems and methods described herein.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, "instantaneous" or "real-time" refers to outcomes occurring at a substantially short period after an input. The time period is a result of the capability of luggage detection device implementing processing of raw image data to generate compressed image data. Events occurring instantaneously or in real-time occur without substantial intentional delay or latency. In the embodiments described herein, these activities and events occur substantially instantaneously.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems and methods described herein facilitate real-time luggage detection based on imaging data generated by a computed tomography (CT) imaging system that includes at least a CT imaging scanner and a luggage detection device.

The subject matter described herein includes a luggage detector that addresses the challenges described above, in part by performing a reconstruction process that enables "false positives" and "false negatives" to be easily diagnosed using a human-perceivable representation of a luggage item (e.g., a bag) that is being scanned by a CT imaging system. The luggage detection implements a luggage detection algorithm configured to determine a leading and a trailing edge of a particular bag in a continuous stream of luggage. Moreover, the luggage detection may determine the length and position of a particular bag based on these determined edges. However, it remains important to properly identify any false positives ("phantom bags") and false negatives ("chopped bags") so that not any bags remain undetected and not scanned. Accordingly, the luggage detection device, as described herein, allows for a bag detection process that receives data from an acquisition system of a CT scanner and performs preprocessing and reconstruction processes on the received acquisition data. Using this acquisition data in the reconstruction domain (i.e., post-reconstruction transformation), the bag detection process allows for a human inspector to easily diagnosis any false positives or false negatives during luggage detection analyzing a human-perceivable representation of a particular bag. Luggage detection device is further configured to additionally filter detected edges of the luggage that may be erroneously detected because of artificial or spurious impetuses. In this embodiment, luggage detection device may rebin the CT imaging data into an intermediate format or partial transformation and may perform at least one statistical measure on the CT imaging data in the intermediate format. Luggage detection device may determine that the statistical measure satisfies a predefined statistical threshold. As a result, luggage detection device may eliminate a leading or a trailing edge of a bag based on whether the statistical measure satisfied the predefined statistical threshold.

More specifically, a luggage detection device for detecting luggage in a computed tomography imaging system is provided. The luggage detection device includes a processor coupled to a memory device and to the CT imaging system. The luggage detection device receives CT imaging data from the CT imaging system. Additionally, the luggage detection device generates a plurality of CT imaging slices from the CT imaging data. For each CT imaging slice, the luggage detection device (i) identifies at least one region within the CT imaging slice for removal based on at least one predefined rule stored in the memory device, (ii) modifies the CT imaging slice by removing the at least one identified region from the CT imaging slice, (iii) generates a pixel count representing a number of pixels in the modified CT imaging slice such that each pixel in the number of pixels includes a pixel value above a predefined threshold pixel value, and (iv) generates an object indicator representing whether luggage is detected in the CT imaging system based on a determination that the generated pixel count is above a predefined threshold pixel count. Further, the luggage detection device displays to a user the at least one of the plurality of CT image slices based on the presence of the corresponding baggage indicator.

In some implementations, the luggage detection device receives the CT imaging data by receiving helical CT imaging data. Additionally, in some implementations, the luggage detection device preprocesses the helical CT imaging data before generating the plurality of CT imaging slices.

In some embodiments, the luggage detection device generates the plurality of CT imaging slices by performing a ray consistency reconstruction using the CT imaging data. In some implementations, the luggage detection device filters detected edges of the luggage by (i) rebinning the CT imaging data into an intermediate format, (ii) performing at least one statistical measure on the CT imaging data in the intermediate format, and (iii) determining that the statistical measure satisfies a predefined statistical threshold.

In some implementations, the luggage detection device identifies at least one region within the CT imaging slice using at least one predefined region designated in the memory device as a region where the luggage cannot be present within the CT imaging system. In some embodiments, the luggage detection device identifies at least one region within the CT imaging slice using at least one predefined region designated in the memory device as a region that is susceptible to producing incorrect CT imaging data due to movement of a conveyor belt within the CT imaging system.

In some embodiments, the luggage detection device stores the plurality of CT imaging slices as a three dimensional representation of the luggage. The luggage detection device, in some implementations, is housed within (e.g., incorporated within) the CT imaging system.

Figure 2:
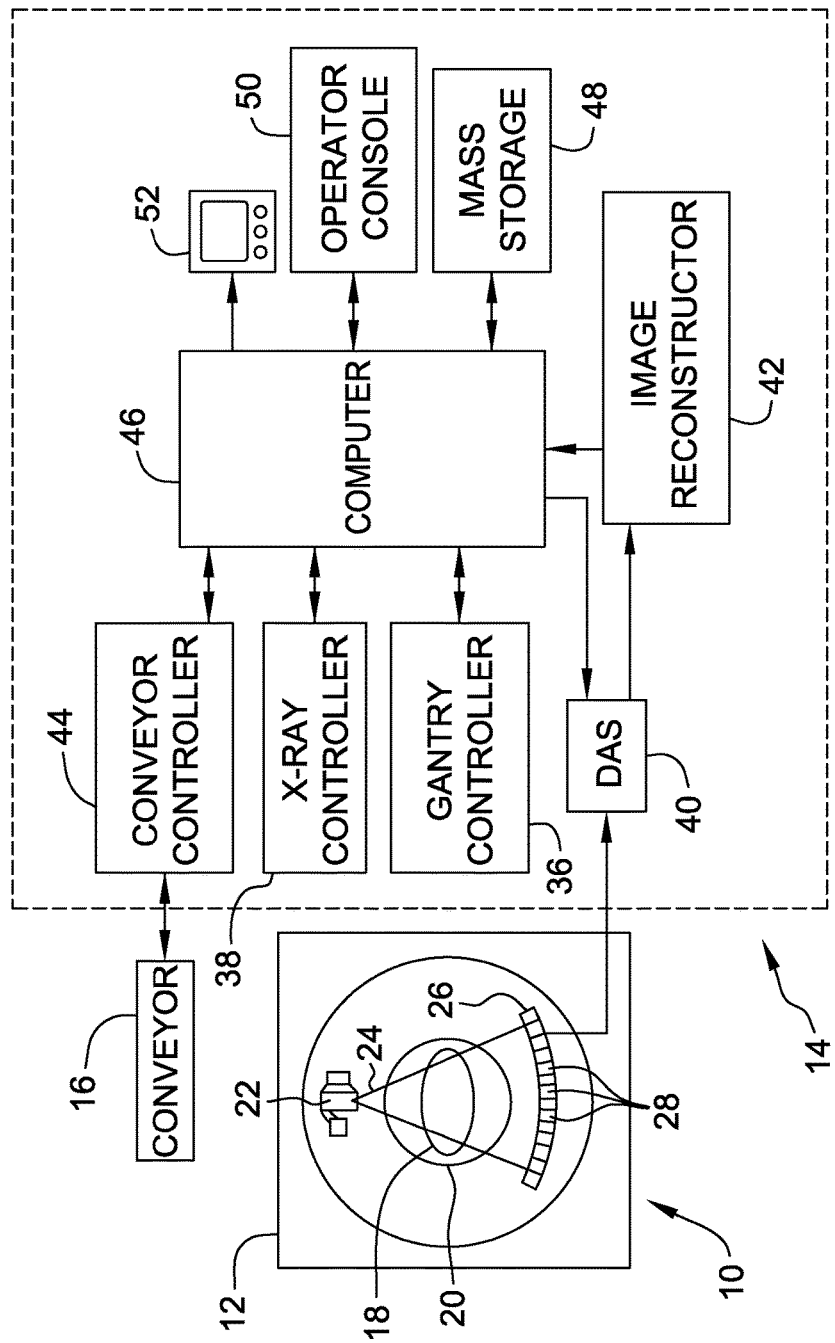

Referring now to FIGS. 1 and 2, a computed tomography (CT) imaging system 10 is shown. CT imaging system 10 is shown having a gantry 12, which is representative of a CT scanner, a control system 14, and a motorized conveyor belt 16 for positioning an object 18, such as a piece of luggage, in a gantry opening 20 defined through gantry 12. Gantry 12 includes an x-ray source 22 that projects a fan beam of x-rays 24 toward a detector array 26 on the opposite side of gantry 12. Detector array 26 is formed by detector elements 28, which are radiation detectors that each produce a signal having a magnitude that represents and is dependent on the intensity of the attenuated x-ray beam after it has passed through object 18 being imaged. During a helical scan that acquires x-ray projection data, gantry 12 along with the x-ray source 22 and detector array 26 rotate within an x-y plane and around object 18 about a center of rotation, while object 18 is moved through gantry 12 in a z-direction 32 perpendicular to the x-y plane of rotation. In the exemplary embodiment, detector array 26 includes a plurality of detector rings each having a plurality of detector elements 28, the detector rings having an angular configuration corresponding to x-ray source 22.

Gantry 12 and x-ray source 22 are controlled by control system 14, which includes a gantry controller 36, an x-ray controller 38, a data acquisition system (DAS) 40, an image reconstructor 42, a conveyor controller 44, a computer 46, a mass storage-system 48, an operator console 50, and a display device 52. Gantry controller 36 controls the rotational speed and position of gantry 12, while x-ray controller 38 provides power and timing signals to x-ray source 22, and data acquisition system 40 acquires analog data from detector elements 28 and converts the data to digital form for subsequent processing. Image reconstructor 42 receives the digitized x-ray data from data acquisition system 40 (or computer 46) and performs preprocessing steps on the digitized x-ray data and an image reconstruction process that involves filtering the projection data using a helical reconstruction algorithm.

Computer 46 is in communication with the gantry controller 36, x-ray controller 38, and conveyor controller 44 whereby control signals are sent from computer 46 to controllers 36, 38, 44 and information is received from controllers 36, 38, 44 by computer 46. Computer 46 also provides commands and operational parameters to data acquisition system 40 and receives reconstructed image data from image reconstructor 42. The reconstructed image data is stored by computer 46 in mass storage system 48 for subsequent retrieval. An operator interfaces with computer 46 through operator console 50, which may include, for example, a keyboard and a graphical pointing device, and receives output, such as, for example, a reconstructed image, control settings and other information, on display device 52.

Communication between the various system elements of FIG. 2 is depicted by arrowhead lines, which illustrate a means for either signal communication or mechanical operation, depending on the system element involved. Communication amongst and between the various system elements may be obtained through a hardwired or a wireless arrangement. Computer 46 may be a standalone computer or a network computer and may include instructions in a variety of computer languages for use on a variety of computer platforms and under a variety of operating systems. Other examples of computer 46 include a system having a microprocessor, microcontroller or other equivalent processing device capable of executing commands of computer readable data or program for executing a control algorithm. In order to perform the prescribed functions and desired processing, as well as the computations therefore (e.g., the execution of filtered back projection, fourier analysis algorithm(s), the control processes prescribed herein, and the like), computer 46 may include, but not be limited to, a processor(s), memory, storage, register(s), timing, interrupt(s), communication interfaces, and input/output signal interfaces, as well as combinations including at least one of the foregoing. For example, computer 46 may include input signal filtering to enable accurate sampling and conversion or acquisitions of such signals from communications interfaces. As described above, exemplary embodiments can be implemented through computer-implemented processes and apparatuses for practicing those processes.

Figure 3:
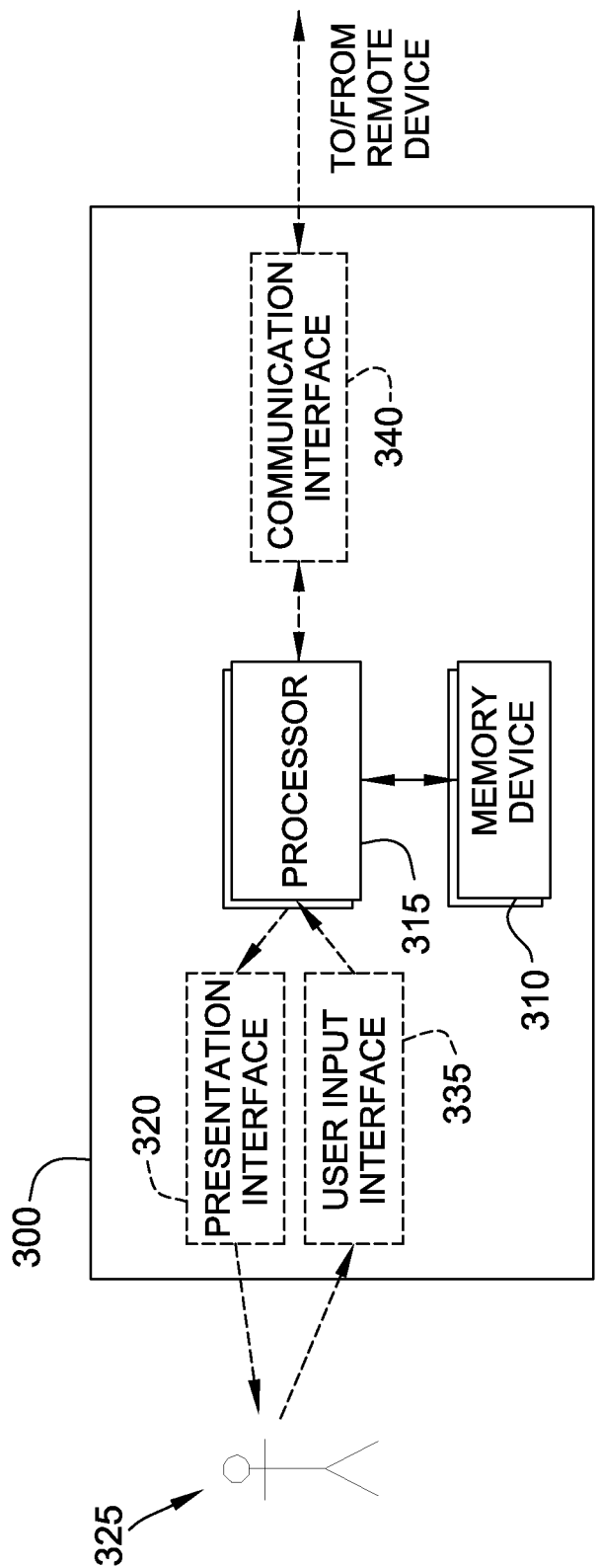

FIG. 3 is a block diagram of a luggage detection device 300 that may be used to detect object 18 (for example and without limitation, luggage, bags, plastic bins of loose objects, briefcases, or any other object) from imaging data generated by a CT imaging system 10, as described herein. Luggage detection device 300 may be implemented as part of control system 14 (for example and without limitation, luggage detection device 300 may replace or be a module disposed within computer 46) or may be a separate computing device in communication with CT imaging system 10 or another imaging system. Luggage detection device 300 includes at least one memory device 310 and a processor 315 that is coupled to memory device 310 for executing instructions. In some embodiments, executable instructions are stored in memory device 310. In the exemplary embodiment, luggage detection device 300 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. In another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), graphics processing units (GPU), and any other circuit capable of executing the functions described herein.

In the exemplary embodiment, memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data. Further, reference templates may be stored on memory device 310.

In the exemplary embodiment, luggage detection device 300 includes a presentation interface 320 that is coupled to processor 315. Presentation interface 320 presents information to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In the exemplary embodiment, luggage detection device 300 includes a user input interface 335. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Luggage detection device 300, in the exemplary embodiment, includes a communication interface 340 coupled to processor 315. Communication interface 340 communicates with one or more remote devices (e.g., in some embodiments, CT imaging system 10). To communicate with remote devices, communication interface 340 may include, for example, a wired network adapter, a wireless network adapter, and/or a mobile telecommunications adapter.

Furthermore, luggage detection device 300 as described herein is configured to receive reconstructed image data such that a user may visually determine whether a potentially detected bag is a false positive ("phantom bags") or false negatives ("chopped bags"). Advantageously, luggage detection device 300 may also provide more efficient processing of luggage detection of a particular bag in a continuous steam of luggage by eliminating irrelevant data in one or more CT imaging slices, such as removing pixel data associated with regions where a bag cannot be present, regions that are sensitive to the motion or tracking of the conveyor belt 108.

In another embodiment, CT imaging system 10 (or luggage detection device 300 therein) transmits human-perceivable image data substantially continuously and in substantially real-time. In some embodiments, CT imaging system 10 (or luggage detection device 300 therein) transmits human-perceivable image data only at the occurrence of a possible false positive or false negative to seek human input.

Figure 4:
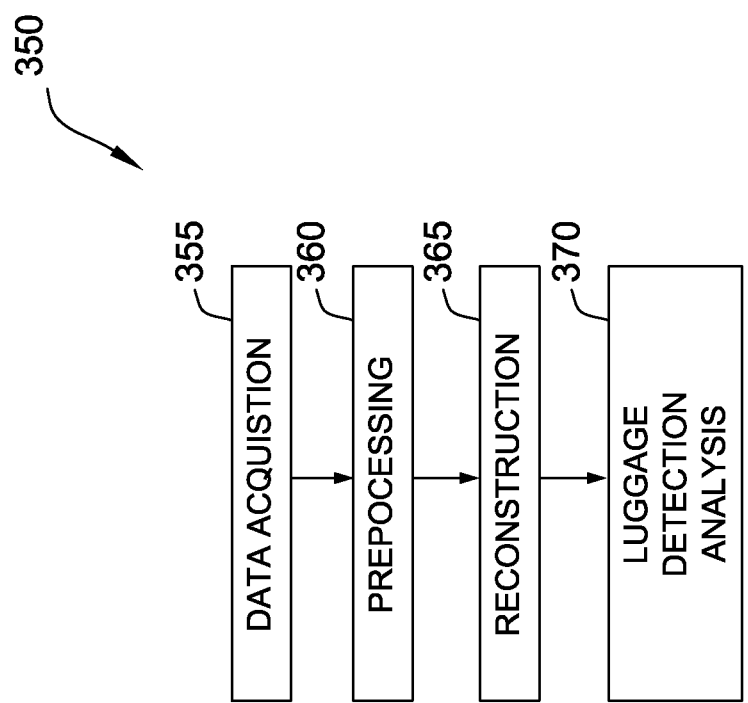

As shown in the example method 350 of FIG. 4, data acquisition system 40 acquires 355 raw image data from captured images of pieces of luggage (for example and without limitation, one or more of items or objects) in a continuous stream of luggage. Generally, data acquisition system 40 acquires in a continuous stream of raw image data of the scanned luggage in any number of formats including helical image data. Image reconstructor 42 (or alternatively data acquisition system 40) may perform, in a continuous manner, any number of preprocessing steps 360 on the acquired raw image data, such as calibrating, normalizing, linearizing, accounting for variations in geometric efficiencies, or any other type of processing that conditions the raw image data for luggage detection processing. Furthermore, image reconstructor 42 may utilize a reconstruction transformation 365 or process to generate a series of CT image slices (i.e., CT image slice data). For example and without limitation, various reconstruction transformation algorithms or methods may include ray consistency reconstruction, filtered backprojection, Feldkamp reconstruction algorithm, or phi reconstruction algorithm. After acquiring raw image data, preprocessing the image data, and performing a reconstruction transformation on the preprocessed data, image reconstructor 42 transmits, in a continuous manner, reconstructed image data that includes a series of multiple CT imaging slices that includes a representation of the imaged stream of luggage to luggage detection device 300 for analysis 370.

Luggage detection device 300 may receive and process one or more CT imaging slices (i.e., reconstructed image data) in series or in parallel. For clarity, the process below is described on a slice-by-slice basis, but it is understood that multiple CT imaging slices could be processed simultaneously. Generally, luggage detection device 300 determines whether a bag or piece of luggage is present in each CT imaging slice of the series of CT imaging slices and associates an indicator with each slice accordingly. Advantageously, luggage detection device 300 determines the length of a particular bag based on the number of slices identified to include a bag "present" indicator and on the resolution or "thickness" of each slice. Moreover, luggage detection device 300 may display to user a 3D representation based on only the CT imaging slices identified to include a bag "present" indicator without performing any reconstruction transformation.

To achieve this luggage detection method or algorithm, luggage detection device 300 acquires each CT imaging slice and identifies one or more regions within that CT imaging slice for pixel value removal based on one or more predefined rules or variables. In some embodiments, luggage detection device 300 implements global rules for particular regions within all CT imaging slices. As an example, luggage detection device 300 denotes the removal of a particular one or more regions within every CT imaging slice because the shape of the axial chamber of CT imaging scanner may physically restrict the placement of luggage in such a manner that a bag is not physically able to fit into that portion of the CT imaging scanner. As another example, luggage detection device 300 is configured to employ a predefined rule that maps one or more regions within one or more CT imaging slices to areas within the CT imaging scanner that are sensitive to motion or tracking of the conveyor belt 108, are prone to relatively larger vibrations, or are subject to other anomalies within the CT imaging scanner. These predefined rules may be standard for all CT imaging scanners 106 or may be tailored to the specific issues of a particular CT imaging scanner.

As a result, luggage detection device 300 is configured to modify a particular CT imaging slice by removing or deleting the pixel value data from the identified regions within that CT imaging slice. In other words, luggage detection device 300 eliminates pixel data in these regions within the specific CT imaging slice to reduce the effects of these identified problem areas within the CT imaging scanner and to decrease the overall effects of signal noise.

Luggage detection device 300 is also configured to determine whether the pixel value for each remaining pixel (i.e., any pixel residing outside the one or more identified regions within the CT imaging slice) is higher than a predefined threshold pixel value. This threshold pixel value may be set at a level sufficiently high to eliminate another layer of noise at the pixel level. Luggage detection device 300 counts a number of pixels (hereinafter "pixel count") in which each pixel is determined to include a pixel value higher than the threshold pixel value (and to reside outside the one or more identified regions). Luggage detection device 300 is configured to determine whether this pixel count number is higher than a predefined threshold pixel count. If this pixel count is determined to be higher than the threshold pixel count, luggage detection device 300 generates and associates an object indicator or baggage indicator with the particular CT imaging slice. Luggage detection device 300 may continue to process each CT imaging slice according to the steps detailed above in a continuous manner.

Luggage detection device 300 is further configured to additionally filter detected edges of the luggage that may be erroneously detected because of artificial or spurious impetuses. In this embodiment, luggage detection device 300 may rebin the CT imaging data into an intermediate format or partial transformation and may perform at least one statistical measure on the CT imaging data in the intermediate format. Luggage detection device 300 may determine that the statistical measure satisfies a predefined statistical threshold. As a result, luggage detection device 300 may eliminate a leading or a trailing edge of a bag based on whether the statistical measure satisfied the predefined statistical threshold.

Figure 5:
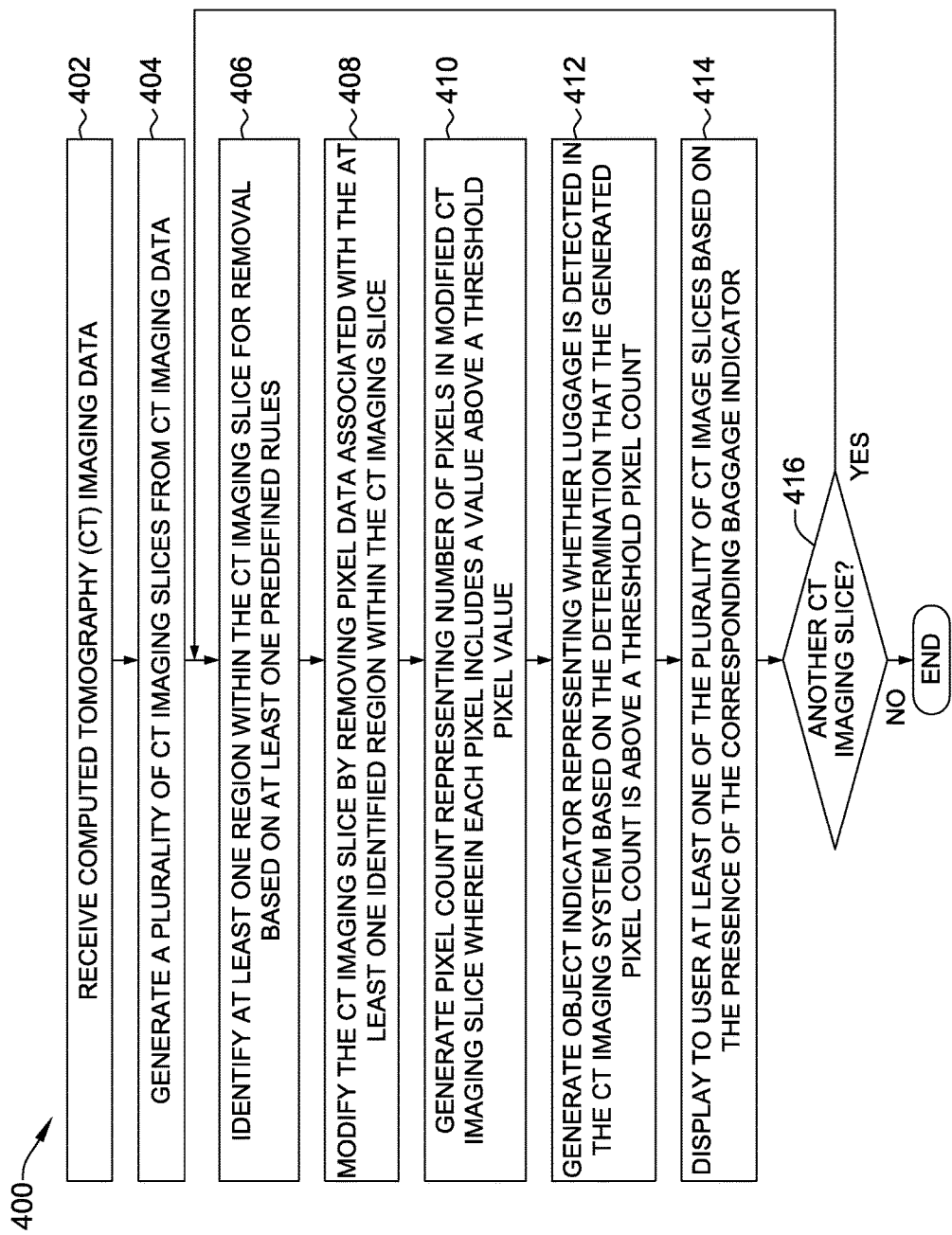

FIG. 5 is an example method 400 for compressing image data generated by computed tomography (CT) imaging scanner 10 (shown in FIG. 1). In the example embodiment, method 400 is performed by a computing system such as luggage detection device 300 (also shown in FIG. 1).

In the example embodiment, method 400 includes receiving 402 CT imaging data generated by the CT imaging scanner 10. Method 400 further includes generating 404 a plurality of CT imaging slices from the received CT imaging data. For each of the plurality of CT imaging slices, method 400 identifies 406 at least one region within the CT imaging slice for removal based on at least one predefined rule, modifies 408 the CT imaging slice by removing pixel data associated with the at least one identified region within the CT imaging slice, generates 410 a pixel count representing a number of pixels in the modified CT imaging slice wherein each pixel in the number of pixels includes a pixel value above a predefined threshold pixel value, and generates 412 an object indicator representing whether luggage is detected in the CT imaging scanner based on a determination that the generated pixel count is above a predefined threshold pixel count. Method 400 further includes displaying to a user one or more of CT image slices based on the presence of the corresponding object indicator. Method 400 continues to process each CT imaging slice accordingly.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A luggage detection device for detecting luggage in a computed tomography (CT) imaging system, said luggage detection device including a processor coupled to a memory device and to the CT imaging system, said luggage detection device is configured to detect luggage by:

receiving, from the CT imaging system, CT imaging data generated by the CT imaging system, the CT imaging data generated by detecting an x-ray beam that is projected across a gantry;
filtering detected edges of the luggage by:
rebinning the CT imaging data into an intermediate format;
performing at least one statistical measure on the CT imaging data in the intermediate format; and
determining that the statistical measure satisfies a predefined statistical threshold;
generating a plurality of CT imaging slices from the CT imaging data by applying a reconstruction transformation to the CT imaging data;
for each of the plurality of CT imaging slices:
identifying at least one region within the CT imaging slice for removal based on at least one predefined rule;
modifying the CT imaging slice by removing pixel data associated with the at least one identified region within the CT imaging slice;
generating a pixel count representing a number of pixels in the modified CT imaging slice wherein each pixel in the number of pixels has a pixel value above a predefined threshold pixel value; and
generating an object indicator representing whether luggage is detected in the CT imaging system based on a determination that the generated pixel count is above a predefined threshold pixel count; and
displaying to a user a three-dimensional representation based on only the CT image slices that include an object indicator, the displayed three-dimensional representation enabling the user to easily visually identify false positives and false negatives.

2. The luggage detection device of claim 1, further configured to receive the CT imaging data by receiving helical CT imaging data.

3. The luggage detection device of claim 1, further configured to generate the plurality of CT imaging slices by performing a ray consistency reconstruction using the CT imaging data.

4. The luggage detection device of claim 1 further configured to identify at least one region within the CT imaging slice based on at least one predefined region that is designated as a region where the luggage cannot be present within the CT imaging system.

5. The luggage detection device of claim 1, further configured to identify at least one region within the CT imaging slice based on at least one predefined region that is designated as a region that is susceptible to producing incorrect CT imaging data due to movement of a conveyor belt within the CT imaging system.

6. The luggage detection device of claim 1, further configured to store the plurality of CT imaging slices as a three dimensional representation of the luggage.

7. The luggage detection device of claim 1, wherein said luggage detection device is housed within the CT imaging system.

8. A computer-implemented method for detecting luggage in a computed tomography (CT) imaging system, said method implemented using a luggage detection device including a processor coupled to a memory device and to the CT imaging system, said method comprising:
receiving, from the CT imaging system, CT imaging data generated by the CT imaging system, the CT imaging data generated by detecting an x-ray beam that is projected across a gantry;
filtering detected edges of the luggage by:
rebinning the CT imaging data into an intermediate format;
performing at least one statistical measure on the CT imaging data in the intermediate format; and
determining that the statistical measure satisfies a predefined statistical threshold;
generating a plurality of CT imaging slices from the CT imaging data by applying a reconstruction transformation to the CT imaging data;
for each of the plurality of CT imaging slices:
identifying at least one region within the CT imaging slice for removal based on at least one predefined rule;
modifying the CT imaging slice by removing pixel data associated with the at least one identified region within the CT imaging slice;
generating a pixel count representing a number of pixels in the modified CT imaging slice wherein each pixel in the number of pixels has a pixel value above a predefined threshold pixel value; and
generating an object indicator representing whether luggage is detected in the CT imaging system based on a determination that the generated pixel count is above a predefined threshold pixel count; and
displaying to a user a three-dimensional representation based on only the CT image slices that include an object indicator, the displayed three-dimensional representation enabling the user to easily visually identify false positives and false negatives.

9. The computer-implemented method of claim 8, wherein generating the plurality of CT imaging slices includes generating the plurality of CT image slices by performing a ray consistency reconstruction using the CT imaging data.

10. The computer-implemented method of claim 8, wherein identifying at least one region within the CT imaging slice includes identifying at least one region within the CT imaging slices based on at least one predefined region that is designated as a region where the luggage cannot be present within the CT imaging system.

11. The computer-implemented method of claim 8, wherein identifying at least one region within the CT imaging slice includes identifying at least one region within the CT imaging slices based on at least one predefined region that is designated as a region that is susceptible to producing incorrect CT imaging data due to movement of a conveyor belt within the CT imaging system.

12. computer-implemented method of claim 8, further comprising storing the plurality of CT imaging slices as a three dimensional representation of the luggage.

13. The computer-implemented method of claim 8, wherein said luggage detection device is housed within the CT imaging system.

14. At least one non-transitory computer-readable storage media having computer-executable instructions embodied thereon, wherein when executed by at least one processor, the computer-executable instructions cause the processor to:
receive, from a CT imaging system, CT imaging data generated by the CT imaging system, the CT imaging data generated by detecting an x-ray beam that is projected across a gantry;
filter detected edges of the luggage by:
rebinning the CT imaging data into an intermediate format;
performing at least one statistical measure on the CT imaging data in the intermediate format; and determining that the statistical measure satisfies a predefined statistical threshold;
generate a plurality of CT imaging slices from the CT imaging data by applying a reconstruction transformation to the CT imaging data;
for each of the plurality of CT imaging slices:
identify at least one region within the CT imaging slice for removal based on at least one predefined rule;
modify the CT imaging slice by removing pixel data associated with the at least one identified region within the CT imaging slice;
generate a pixel count representing a number of pixels in the modified CT imaging slice wherein each pixel in the number of pixels has a pixel value above a predefined threshold pixel value; and
generate an object indicator representing whether luggage is detected in the CT imaging system based on a determination that the generated pixel count is above a predefined threshold pixel count; and
display to a user a three-dimensional representation based on only the CT image slices that include an object indicator, the displayed three-dimensional representation enabling the user to easily visually identify false positives and false negatives.

15. At least one non-transitory computer-readable storage media in accordance with claim 14, wherein the computer-executable instructions further cause the processor to generate the plurality of CT imaging slices by performing a ray consistency reconstruction using the CT imaging data.

16. At least one non-transitory computer-readable storage media in accordance with claim 14, wherein the computer-executable instructions further cause the processor to identify at least one region within the CT imaging slices based on at least one predefined region that is designated as a region where the luggage cannot be present within the CT imaging system.

17. At least one non-transitory computer-readable storage media in accordance with claim 14, wherein the computer-executable instructions further cause the processor to identify at least one region within the CT imaging slices based on at least one predefined region that is designated as a region that is susceptible to producing incorrect CT imaging data due to movement of a conveyor belt within the CT imaging system.

18. At least one non-transitory computer-readable storage media in accordance with claim 14, wherein the computer-executable instructions further cause the processor to store the plurality of CT imaging slices as a three dimensional representation of the luggage.

* * * * *